United States Patent [19]

Patterson

[11] Patent Number: 5,139,815

[45] Date of Patent: Aug. 18, 1992

[54] ACID CATALYZED SILICONE RELEASE LAYERS

[75] Inventor: Robert Patterson, Neenah, Wis.

[73] Assignee: H. P. Smith, Inc., Bedford Park, Ill.

[21] Appl. No.: 566,099

[22] Filed: Aug. 13, 1990

[51] Int. Cl.[5] .................... B05D 3/06; B05D 3/02; B05D 1/36

[52] U.S. Cl. .................... 427/54.1; 427/44; 427/53.1; 427/55; 427/387; 427/412.1

[58] Field of Search .......... 427/44, 53.1, 54.1, 427/55, 389, 412.1

[56] References Cited

U.S. PATENT DOCUMENTS

| | | | |
|---|---|---|---|
| 4,016,333 | 4/1977 | Gaske et al. | 427/44 |
| 4,279,717 | 7/1981 | Eckberg et al. | 428/413 |
| 4,310,600 | 1/1982 | Cross | 427/54.1 |
| 4,313,988 | 2/1982 | Koshar et al. | 427/54.1 |
| 4,378,389 | 3/1983 | Maruyama et al. | 427/387 |
| 4,388,137 | 6/1983 | McCarty et al. | 427/54.1 |
| 4,421,904 | 12/1983 | Eckberg et al. | 528/27 |
| 4,576,999 | 3/1986 | Eckberg | 525/476 |
| 4,609,589 | 9/1986 | Hosoda et al. | 428/352 |
| 4,617,238 | 10/1986 | Crivello et al. | 428/452 |
| 4,640,967 | 2/1987 | Eckberg | 528/26 |
| 4,663,185 | 5/1987 | Eckberg | 427/54.1 |
| 4,770,992 | 9/1988 | Itoh et al. | 427/54.1 |
| 4,859,511 | 8/1989 | Patterson et al. | 428/40 |

*Primary Examiner*—Marianne Padgett
*Attorney, Agent, or Firm*—Burns, Doane, Swecker & Mathis

[57] ABSTRACT

A release sheet for adhesive products is provided wherein an acidic material such as an acidic polymer is disposed between a substrate layer and an acid catalyzed silicone release layer. The acid catalyzed silicone release layer is preferably a photocationic curable cycloaliphatic epoxy functional poly-dimethyl-siloxane. Provision of the acidic material between the silicone release layer and the substrate prevents neutralization of acids formed during cure of the silicone layer. Thus, faster cure times can be achieved.

9 Claims, 1 Drawing Sheet

ACID CATALYZED SILICONE RELEASE LAYERS

BACKGROUND OF THE INVENTION

1. Field of the Invention

The present invention relates to release sheets for adhesive coated products.

2. Description of Related Art

Release sheets have been made using a wide variety of substrates, including cellulosic materials such as paper and paperboard, polymeric films, and cellulosic materials coated with polymeric films. Release coatings, too, form a diverse categorization--fluorocarbons, chromium complexes, fatty acid amides, long chain hydrocarbon-containing polymers, and various silicone polymers have been found to be useful in the manufacture of release coatings. Among the undercoating layers which have been used are those formed by polyethylene extrudates, by clay-based pigments used in conjunction with water-soluble polymers such as poly(vinyl alcohol), and by starch size press coatings thickened with Kelgin (sodium alginate), carboxymethylcellulose, or polyvinyl alcohol. These under coats are intended to provide "hold out" for the silicone coating and to enhance the smoothness of the base sheet.

U.S. Pat. No. 4,859,511 discloses the use of undercoating layers which are hydrophobic in nature, and are characterized by low tensile strength, low glass transition temperature and low modulus of elasticity. U.S. Pat. No. 4,609,589 is directed to release sheet undercoatings based upon mixtures of certain acrylic resin emulsion compositions.

SUMMARY OF THE INVENTION

The present invention utilizes an acidic material, which is disposed between a silicone layer and the release base layer of a release sheet, to enhance the cure of the silicone layer. The acid material performs several functions. One important function of the acid material is that it separates the silicone layer from the release base. A second function is that the acid layer prevents neutralization of the acids formed by photolysis of the photoinitiator. A third function is that the acid groups catalyze the cure of the silicone layer. A fourth function is that the acid groups provide anchorage of the silicone layer to the polymer by chemically reacting with the silicon polymers.

Conventional size press coatings used on release base contain Kelgin (sodium alginate), CMC (sodium carboxymethylcellulose) or PVOH (polyvinyl alcohol). Kelgin and CMC are salts of weak acids and strong bases and, consequently, are basic. The surface pH of these coatings is 8 to 9. In a Lewis base sense, these coating components will neutralize the acid moieties generated by photolysis of a photoinitiator used to cure the silicone layer. PVOH is too basic to provide an improved cure response. The concentration of basic groups in typical size press coatings is 50 to 100 times greater than the concentration of acid. These basic groups must be eliminated in order to achieve acceptable curing rates.

The release sheet of the present invention comprises a substrate layer having an acidic material on one surface thereof and an acid catalyzed silicone release layer disposed on the acidic material. The release sheet of the present invention can be made by a process which comprises the steps of providing an acidic material on one surface of a substrate layer, applying an acid catalyzed uncured silicone release layer on the acidic material which is on the surface of the substrate layer, and curing the thus applied silicone release layer.

DETAILED DESCRIPTION OF THE INVENTION

Figure 1:
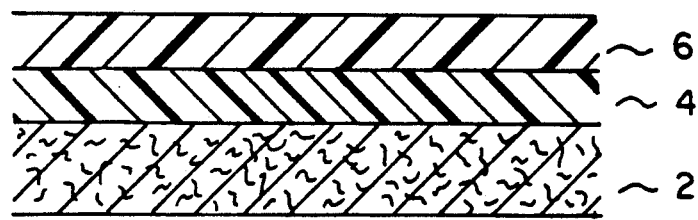
FIG. 1 is a Cross-sectional view of one embodiment of the present invention wherein a layer of acidic polymer is disposed between the release base and the acid catalyzed silicone layer.

As used herein, the term "release base" refers to any substrate onto which an acid catalyzed silicone layer can be effectively applied to prepare a "release sheet" for adhesive products. A "release sheet" is a temporary member used to facilitate the handling of adhesive-coated products. Various types of release sheets are used with adhesive products such as adhesive tapes, bumper stickers, labels, sealants, caulks, mastics, medical devices, solar screen films rubber separator sheets, etc. The release coating on the release sheet should adhere sufficiently to the support substrate to prevent transfer of the release coating to the adhesive with resultant detackification of the adhesive. The construction of the release sheet used for such purposes consists of a support substrate having a release layer formed on at least one side thereof. An undercoating holdout layer may be interposed between the support substrate and the release layer. The present invention is particularly useful with release bases which are chemically basic since significantly improved cure rates can be achieved when the release base is separated from the acid catalyzed silicone.

The terms "disposed on" indicate that one layer is bonded to another layer, either directly or through one or more intermediate layers.

Examples of the support substrate in the release sheet according to the present invention include cellulosic and/or polymeric materials such as paper bases, nonwoven fabrics, polymeric films, and extrusion-coated papers.

Suitable paper bases are made of bleached, semi-bleached, and natural Kraft paper, supercalendered Kraft paper, parchment, glassine, machine-finished paper, machine-glazed paper, fine paper, and paperboard having basis weights of 18–400 g/m$^2$ and thicknesses of 30–500 microns.

Suitable nonwoven fabrics have basis weights of 10–150 g/m$^2$ and thicknesses of 30–400 microns and are produced by the dry method, wet method, or direct melt methods.

Preferred materials include, paper, films and polymer-coated paper. If paper is used as the release base, the paper is preferably a high-density, non-porous, supercalendered paper.

If the release base is a film, the film is preferably formed from a polymer or copolymer such as polyethylene terephthalate (PET), oriented polystyrene, rubber modified polystyrene, polypropylene or polyethylene. If the release base is a polymer-coated paper, the paper can be any of the above-mentioned papers. In addition, the paper can be a low-density paper which is extrusion coated with any polymer film such as the above discussed films and preferably a polyolefin such as polypropylene or polyethylene. For most commercial applications, the substrate will have a thickness of 1 to 10 mils, preferably 2 to 5 mils, and most preferably about 2.5 mils.

The acidic material can be present in any form which effectively provides acid groups to the silicone layer. The acid material should be present in an amount sufficient to provide a surface with a pH of about 6 or less, preferably a pH of about 1 to about 5, more preferably a pH of about 1.5 to about 4 and most preferably a pH of about 1.5 to about 3. A surface with a pH of about 2 has been shown to provide very good results.

The acidic material is preferably formed into a layer or present in a layer which is applied to the surface of the release base. The layer may consist essentially of the acidic material or other materials may also be included in the layer. When the acidic material is present in a layer, it effectively separates the release base from the silicone layer. The silicone layer is applied directly to the acidic layer. If the acid material is present in the form of a separate layer, the layer should have a thickness sufficient to form a continuous layer which effectively separates the release base from the silicone layer. Such a layer will usually have a thickness of at least about $0.3\mu$ and will usually have a thickness of about 0.5 to about $5\mu$. The acid layer can be formed in any suitable manner such as by roto gravure or rod coating. It may also be possible to form the acid layer by use of melt processing extrusion coating equipment. For example, an acid material such as ethylene/acrylic acid can be extrusion coated onto the paper.

The acidic material can also be incorporated into a coating which is applied to the paper. For example, the acidic material can be incorporated into a starch size press formulation for a paper base. If the acidic material is incorporated into such a formulation, the size press formulation should be as thin as possible while providing a continuous coating which separates the base material from the silicone layer. The acidic coating will probably have a thickness of at least about $0.5\mu$, usually about 0.5 to about $5\mu$, and most preferably about 1 to about $2\mu$. The acidic polymer is preferably present in the size press formulation in an amount of about 2 to about 10%, preferably about 3 to about 7% by weight based on the total dry weight of the size press formulation. The acidic polymer, when used in this context, functions not only as a source of acid, but also as a film former and a viscosifier in the starch size press formulation. The size press coating can be formed in any suitable manner such as by use of a conventional size press coating process, a gate roll coater or a blade coater.

The acid material is preferably a Lewis acid. The acid material will usually be a polymer containing acid groups such as carboxylic acid groups (—COOH) or sulfonic acid groups (—SO$_3$H). Exemplary polymers which contain such groups are polyacrylic acid, ethylene acrylic acid copolymers, ethylene maleic acid copolymers and polyacryloamidomethylpropane sulfonic acid.

The silicone layer can be any silicone layer, the cure of which is catalyzed by acids. The silicone is preferably a photocationic curable silicone such as cycloaliphatic epoxy functional poly-dimethylsiloxane. Suitable photocationic curable silicones are disclosed in U.S. Pat. Nos. 4,279,717, 4,421,904, 4,617,238, 4,640,967 and 4,663,185 to Eckberg and Crivello which are hereby incorporated by reference. The silicone layer can be formed in any suitable manner such as by offset gravure or multiple roll coating.

The cure of cycloaliphatic epoxy functional polydimethylsiloxane release coatings is catalyzed by strong acids. These acids can be provided in many ways, such as directly or in a latent form. Any type of acid catalyst can be used to catalyze the cure of the silicone. However, since direct addition of an acid such as paratoluene sulfonic acid leads to immediate cure of the silicone and an impractical potlife, latent acid catalysts are preferred. Such latent acid catalysts will provide improved potlife as they will become active only after exposure to an initiating source such as heat, ultraviolet light, etc. UV-sensitive acid generating catalysts are widely known and provide the basis for UV-curable epoxy coatings. Included in this group are compounds such as the bisaryliodonium salts described in the above-referenced U.S. Patents to Eckberg and Crivello which are incorporated by reference.

On exposure to UV light, these photoinitiators break down yielding acid groups which further catalyze the cure of the silicone. For example, hexafluoroantimonic acid is generated when bis(4-n-dodecylphenyl)iodoniumhexafluoroantimonate is exposed to UV radiation with a wavelength of 200-300 nm, particularly 230-250 nm. If the acid species generated on UV exposure is in contact with basic groups in a coating, the acid will be neutralized and cure will not take place.

The catalyst is present in an amount sufficient to catalyze the cure of the silicone resin under the curing conditions employed. The catalyst will usually be present in an amount of about 0.5 to 20, preferably 1 to 10 and most preferably 1 to 5 parts by weight based on the weight of the silicone.

DESCRIPTION OF THE PREFERRED EMBODIMENTS

As shown in FIG. 1, a release base such as supercalendered Kraft paper 2 is coated with a poly(ethylene acrylic acid) ammonium salt dispersion by roto gravure or offset gravure to form a layer 4 of ethylene acrylic acid copolymer. The coating is then dried which drives off the ammonia (NH$_2$) groups thereby providing free carboxylic acid groups. A silicone coating is then applied by an offset gravure process to provide a silicone layer 6 having a thickness of about 0.5 to $1\mu$. The silicone composition contains 3 parts by weight of catalyst per 100 parts by weight of silicone. The thus formed product is then cured in a UV curing oven by exposure to a mercury vapor lamp. Simultaneous heating to a temperature of about 40° C. will also occur but is not crucial to cure the silicone.

Figure 2:
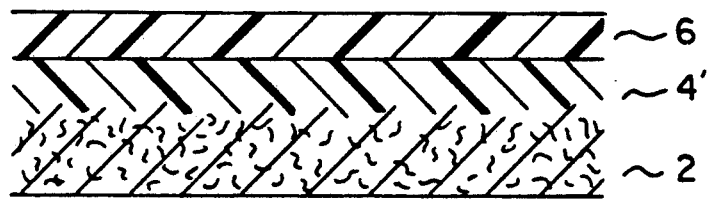
FIG. 2 is a cross-sectional view of another embodiment of the present invention wherein the acid material is incorporated into a coating which is applied to one surface of the release base and the acid catalyzed silicone layer is applied directly to the coating.

FIG. 2 shows embodiment wherein the acidic material is incorporated in a starch size press formulation to form an acidic starch size press coating 4'.

EXAMPLES

Sodium (Michelman 48525) and ammonium (Michelman 4983) salts of a 20% acrylic acid ethylene acrylic acid copolymer dispersion were blended at various levels to provide a coating material having several ratios of COOH/COONa. The resulting ratios were characterized by measuring the pH of the dried coating. The pH values are tabulated below:

| COOH (4983)/COONa (48525) Ratio, g/g | | pH |
|---|---|---|
| Example 1 | 100/0 | 2.0 |
| Example 2 | 75/25 | 3.2 |
| Example 3 | 50/50 | 6.3 |
| Example 4 | 25/75 | 6.8 |
| Example 5 | 10/90 | 7.0 |
| Example 6 | 5/95 | 8.0 |
| Example 7 | 0/100 | 8.2 |

The blended dispersions were applied to a smooth holdout base paper using a #5 draw rod. The coating solids were 25%. The resulting dry coating weight was 2.4–2.8 g/m$^2$. From this group of materials, three levels, 100/0, 50/50, and 0/100, were selected for further studies with the cycloaliphatic epoxy PDMS poly(dimethylsiloxane) release coating.

General Electric UV 9300, a cycloaliphatic epoxy functional polydimethyl siloxane oligomer, was used throughout the pH study. General Electric UV 9310C, the dodecylphenyl iodonium hexafluoroantimonate catalyst, as received, was added at a 2% level to GE9300. This formulation was applied to the dispersion-coated papers using a Pamarco proofer at a rate of 1.0–1.5 g/m$^2$. The coated sheets were run under a 200 watt/inch medium pressure Hg vapor lamp. The spectral output of this type of lamp is rich in the 230–250 nanometer region, making it an ideal match for the photoinitiator. The coatings were cured at speeds from 10 feet/min to 94 feet/min, the maximum speed of the conveyor system, depending on pH. The cure of the coatings was characterized by smear, rub, and migration tests familiar to those experienced with silicone release coatings. The results of the cure studies are summarized in Tables I and II. These tables compare cure speed to the pH or COOH/COONa ratio of the base paper. Higher speed indicates more complete cure.

TABLE I

| Full Lamp Power, 200 w/in | |
|---|---|
| pH | Cure Speed, ft/min |
| 2.0 | >94 |
| 6.3 | <<34 |

TABLE I-continued

| Full Lamp Power, 200 w/in | |
|---|---|
| pH | Cure Speed, ft/min |
| 8.2 | <<32 |

TABLE II

| One-half Lamp Power, 100 w/in | |
|---|---|
| pH | Cure Speed, ft/min |
| 2.0 | 80 |
| 6.3 | <10 |
| 8.2 | <<10 |

It is evident from these data that the cure is strongly influenced by pH and that a desirable coating is achieved when there is enough of the carboxylated polymer to adjust the surface pH to 2.0.

I claim:

1. A process for preparing a release sheet, comprising the steps of:
   providing an acidic material on at least one surface of a substrate layer, wherein the acidic material is provided in an amount sufficient to provide a surface with a pH of about 1 to about 5;
   applying an acid catalyzed uncured silicone release layer on said acidic material on said surface of said substrate layer; and
   curing said silicone release layer.

2. The process of claim 1 wherein said acidic material consists essentially of an acidic polymer.

3. The process of claim 2, wherein the acidic polymer is selected from the group consisting of polyacrylic acid, ethylene acrylic acid copolymer, ethylene maleic acid copolymer and polyacryloamidomethyl propane sulfonic acid.

4. The process of claim 1, wherein the acidic material is extrusion coated onto the substrate layer.

5. The process of claim 1, wherein said silicone release layer is a photocationic curable release layer and curing is initiated by exposing said silicone release layer to UV light.

6. The process of claim 5, wherein said curing further includes the step of heating said silicone release layer.

7. The process of claim 1 wherein the acidic material provides a surface with a pH of about 1.5 to about 4.

8. The process of claim 1, wherein the acidic material provides a surface with a pH of about 1.5 to about 3.

9. The process of claim 1, wherein the acidic material provides a surface with a pH of about 2.

* * * * *